April 15, 1969 G. E. PETERSON 3,439,259

WIDEBAND FEEDBACK COHERENCE CONTROL FOR SUPERREGENERATIVE OSCILLATORS

Filed May 28, 1965

INVENTOR
G. E. PETERSON
BY E. J. Olinder
ATTORNEY

April 15, 1969 G. E. PETERSON 3,439,259

WIDEBAND FEEDBACK COHERENCE CONTROL FOR SUPERREGENERATIVE OSCILLATORS

Filed May 28, 1965 Sheet 2 of 2

United States Patent Office 3,439,259
Patented Apr. 15, 1969

3,439,259
WIDEBAND FEEDBACK COHERENCE CONTROL FOR SUPERREGENERATIVE OSCILLATORS

George E. Peterson, Plainfield, N.J., assignor to Bell Telephone Laboratories, Incorporated, New York, N.Y., a corporation of New York Filed May 28, 1965, Ser. No. 459,834
Int. Cl. G01n *27/00;* G01r *33/08*
U.S. Cl. 324—.5 6 Claims

ABSTRACT OF THE DISCLOSURE

The sensitivity and coherence of regenerative oscillators are stabilized over a wideband by a feedback loop which produces a correction signal in accordance with a difference signal obtained through a comparison of the oscillator noise level with a predetermined standard.

This invention relates to detection means having high sensitivity, and more specifically, to a device for detecting nuclear resonance.

Super-regenerative, self-quenched oscillators have been used to detect nuclear resonance in solids, especially nuclear quadrupole resonance. However, their usefulness as research tools for detecting weak or low level signals has been limited. The limitation is a result of the continuing necessity to adjust the oscillator quench frequency as the oscillator frequency is varied during the search for resonance. If the quench frequency is not adjusted, the system's electrical noise level may increase to such a magnitude that it covers weak signals thus making them undetectable. In addition, if it is desired to operate the system coherently, the change in oscillator frequency results in a change in coherency which reseults in a change in the system's noise level.

The invention is embodied within a system wherein a super-regenerative, self-quenched oscillator is used to generate discrete coherent pulses of energy that are applied to a test sample. The frequency of the oscillator can be varied over a wide range of frequencies.

The noise level of the oscillator is stabilized and kept constant by automatically adjusting the grid bias of the oscillator as the oscillator frequency is changed. The adjustment is made through a feedback system.

The magnitude of the grid bias adjustment is determined by comparing the rectified and filtered noise spectrum of the system to a predetermined standard. Any nuclear resonance signals or low level signals are filtered from the noise spectrum before it is compared to the standard. The servo system then detects any difference between the noise level and the standard, and automatically adjusts the grid bias of the oscillator to maintain the noise level constant and substantially equal to the predetermined standard. Automatic control of the system's noise level is maintained over a large bandwidth of frequencies; for example, 15 megacycles to 1,000 megacycles.

The above-described system is therefore capable of searching for nuclear resonance or other low level signals over large ranges of frequencies. The noise level of the system is automatically adjusted as the frequency of the oscillator is changed, so that the noise level remains constant and thereby allows detection of the desired signals without loss of coherency.

The invention will be better understood and its features and advantages more readily apparent upon a study of the following detailed description of an illustrative embodiment of the invention when it is read in conjunction with the drawing in which.

Figure 1:
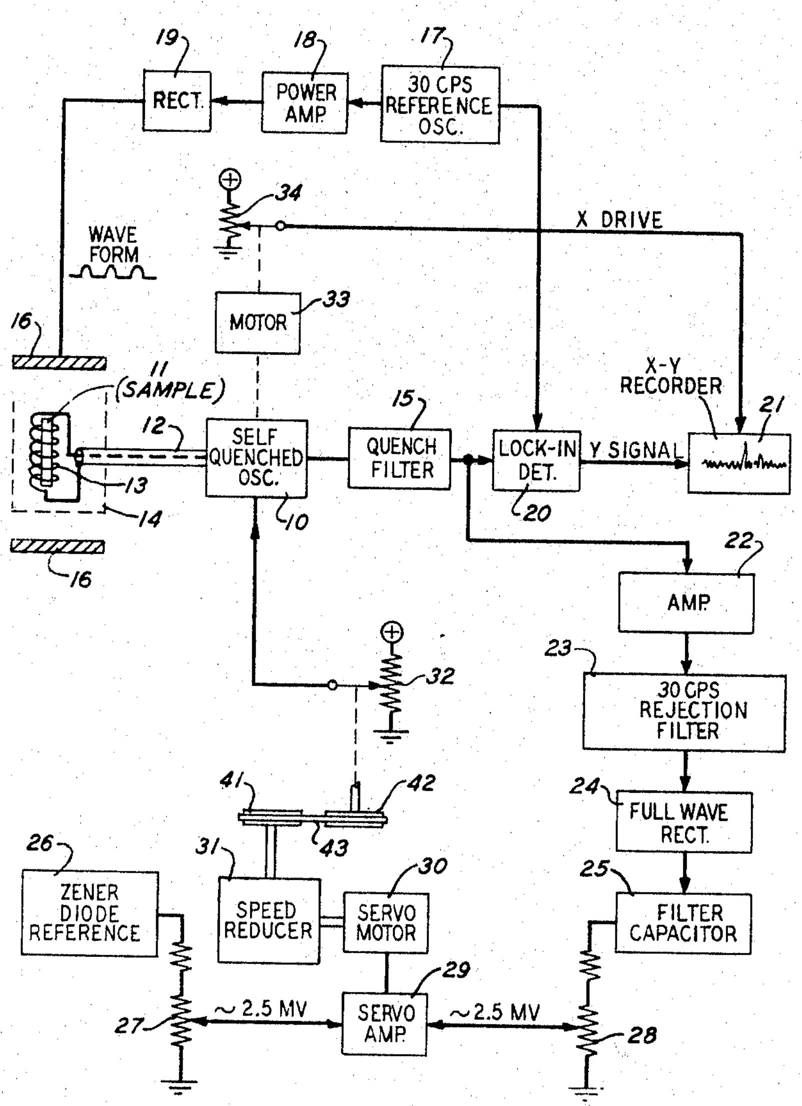
FIG. 1 is a block diagram of the system.

In accordance with the illustrative embodiment of the invention, and particularly with reference to FIG. 1, the invention comprises a super-regenerative, self-quenched, variable frequency oscillator 10. The frequency of the oscillator 10 may be varied over a wide range of frequencies, thus being capable of generating pulses of energy over a broad bandwidth for search purposes. The oscillator 10 generates pulses of energy which are applied to a test sample 11 by means of a rigid coax 12 and a coil 13 in which the sample 11 is inserted. The coil 13 is part of the tank circuit of the oscillator 10. If shielding is required, the tank circuit can be isolated by means of a shield 14 which in the illustrative embodiment is shown as a copper container 14 with a hole in its top. Sample 11 is inserted into the coil 13 through the hole in the shield 14.

The output of the socillator 10 is taken through a low pass filter 15 that filters the quench pulses from the output signal. The resulting signal is then comprised of system noise and any resonant or low level signals that are to be detected.

In order to facilitate detection of the low level signals, the signals are modulated. Modulation is accomplished by including in the system a reference oscillator 17 which, for illustrative purposes, is shown as the 30 cycle per second oscillator 17. The oscillator 17 is connected to a power amplifier 18 which is in turn connected to a half wave rectifier 19. The output of the rectifier 19 is connected to a pair of Helmholtz coils 16 which surround the sample 11 and bathes the latter and the coil 13 in a cyclic magnetic field.

The ference oscillator 17 generates a 30 cycle per second sine wave that is amplified by the amplifier 18 and then half wave rectified by the rectifier 19. The resulting scallop-shaped waveform is then used to drive the coils 16.

The resulting 30 cycle per second magnetic field generated by the coils 16 is of sufficient magnitude to wash out any low level resonance signal or echo emitted from the sample 11. Thus, when a resonant signal is obtained from the sample 11 it appears as a 30 cycle per second signal impressed upon a noise signal from the oscillator 10.

The output from the filter 15 is connected to a lock-in detector 20 that is in turn connected and referenced to the reference oscillator 17. The detector 20 is responsive to any signal coming from the filter 15 that is in phase with and of the same frequency as the reference oscillator 17. Thus, a resonance signal emitted from sample 11 is modulated, as above described, and the modulated signal is detected by the lock-in detector 20.

The output of the detector 20 is in turn connected to the Y drive of an XY recorder 21. Any signal detected by the detector 20 is displayed on the Y axis of the recorder 21.

The frequency of the oscillator 10 is varied by means of a motor 33. Selection of the motor 33 depends upon the r.p.m. of the motor which in turn depends upon the extent of the range of frequencies through which the oscillator 10 is varied and upon how fast the scan of the range is desired. It is obvious that a different motor 33 will be required to make a slow scan of a large range of frequencies than will be required to scan a smaller range of frequencies over a short time.

In order to relate the frequency of the oscillator 10 to any resonance signal that is indicated by the recorder 21, the motor 33 is also used to control the X drive of the XY recorder 21. As shown in FIG. 1, the motor 33 is coupled to a variable resistor 34 that controls the power supply to the X drive of the recorder 21. Thus, by interconnecting the oscillator 10 with the X drive of the recorder 21, when resonance has been detected, the variable resistor 34 that controls the X drive of the recorder 21 may be turned back to the indicated resonance. A frequency measurement of the oscillator 10 can then be made.

The output of the oscillator 10, after it has been filtered by the filter 15 to remove the quench pulses, is also fed to an amplifier 22 and then to a rejection filter 23. The filter 23 is coordinated with the oscillator 17 so that it blocks or filters out any signals that are of the same frequency as the modulating frequency. The result is that the output of the filter 23 represents the noise of the system because any nuclear signal along with any noise that is of the same frequency as the modulating frequency will be rejected by the filter 23.

The signal from the filter 23 is then converted to a D-C signal by passing it through a full wave rectifier 24 and a filter capacitor 25. The D-C signal from the capacitor 25 is then compared to a predetermined standard. The standard is a second D-C signal that is generated by a Zener diode reference source 26. If required, both D-C signals may be attenuated by the variable resistors 27 and 28. The D-C signals, for illustrative purposes, are attenuated to approximately 2.5 millivolts.

Any difference between the D-C signal from the capacitor 25 and the reference source 26 generates an error signal which is detected by a servo amplifier 29. By means of a servo motor 30 and a speed reducer 31, the grid bias potentiometer 32 of the oscillator 10 is adjusted. This adjustment varies the quench frequency of the oscillator 10 and hence its coherency and noise level. As shown, the speed reducer 31 may be comprised of two pulleys 41 and 42 and a drive belt 43.

The operation of the system may be best described by applying it to the detection of unknown nuclear quadrupole resonance. In order to detect nuclear quadrupole resonance, super-regenerative methods have been used in which the oscillator 10 oscillates coherently. That is, each pulse of the oscillator 10 is in phase with and initiated by the previous decaying pulse. It is necessary that the quench frequency of the oscillator 10 be adjusted so that the initiation of pulses will occur above the noise level of the system, thus insuring coherency.

The envelope of a coherent waveform, as discussed above, is shown in FIG. 2 wherein the leading edge 35 indicates the envelope of the build-up of a pulse, the trailing edge 36 indicates the envelope of the pulse as it decays, and the point 37 indicates the initiation of a subsequent pulse by the previous pulse.

Lines 38 represent the noise level of the system and in order to preserve coherency, they must be held constant and below the level at which initiation of the oscillator pulses is started.

Figure 2:
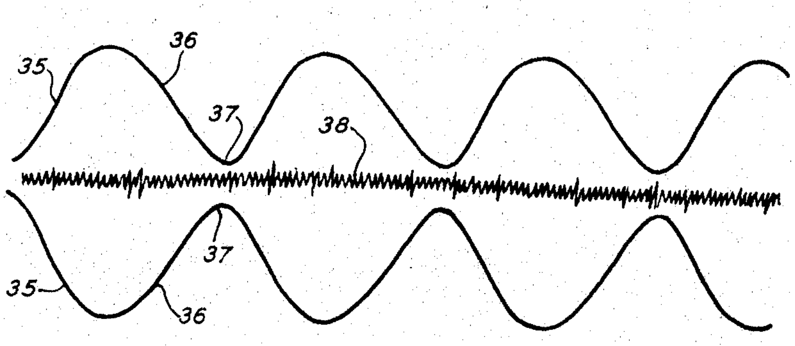
FIG. 2 is a representation of the envelope of ocherent oscillations and a constant noise signal.

If a test sample 11 of a material is inserted into the system as shown in FIG. 1 and subjected to pulses of energy whose waveform is shown in FIG. 2, nuclear resonance may be discovered and detected by varying the oscillator frequency over the bandwidth to be searched.

During nuclear resonance, the spin system of the test sample 11 absorbs energy and is caused to precess in phase with the pulses from the oscillator 10. After quenching of the oscillator pulse, a nuclear signal is emitted that lasts for a time of the order of the spin-spin relaxation time.

The next pulse from the oscillator 10 can be initiated by the nuclear signal rather than the noise of the system or the previous decaying pulse if the previous decaying pulse decays faster than the nuclear signal and the initiation of an oscillator pulse occurs on the tail of the decaying nuclear signal. If the above conditions exist, a speed-up will occur in the rate at which the oscillator 10 self-quenches. This results in an increase in the integrated plate current of the oscillator 10. It is this increase in plate current that the detector 20 detects and indicates as resonance.

Figure 3:
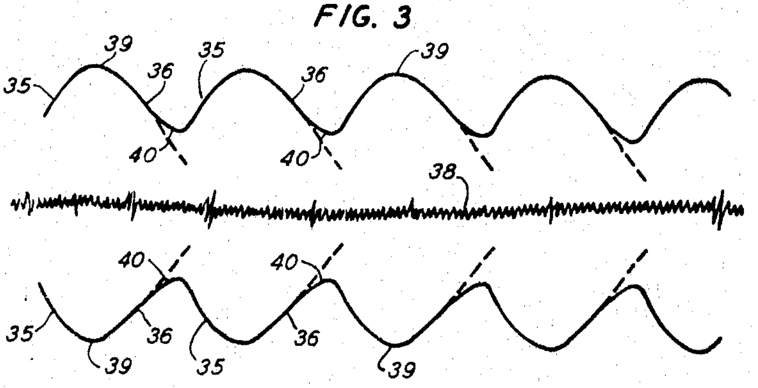
FIG. 3 is a representation of the envelope of coherent oscillations when detection of a nuclear resonant signal or other similar low level signal is acquired.

FIG. 3 shows the waveform of a signal where nuclear quadrupole resonance has been obtained. The leading edge 35 indicates the envelope of the build-up of a pulse from the oscillator 10. At 39 the oscillator 10 self-quenches and the pulse decays in accordance with the trailing edge 36. The line 40 indicates the decaying nuclear signal and, as shown, it decays at a rate slower than the decaying oscillator pulse represented by the trailing edge 36. The nuclear signal therefore extends beyond the edge 36. The subsequent pulse is then initiated upon the decaying nuclear signal 40 rather than upon the decaying previous pulse. By comparing the waveform shown in FIG. 3 to that shown in FIG. 2, it can be seen that the rate at which the oscillator 10 self-quenches is increased when nuclear resonance is obtained. This increase in the rate of self-quenching is shown by the decrease in period of the pulses and it is accompanied by an increase in the plate current of the oscillator 10. As previously mentioned, it is the increase in plate current that indicates resonance.

When the system is used as a research tool for detecting nuclear quadrupole resonance, the frequency of the oscillator 10 is set at the lowermost frequency of the bandwidth that is to be scanned. The motor 33 is then turned on which initiates the X drixe of the XY recorder 21. The motor 33 also starts the scan over the desired range of frequencies by starting to vary the frequency of the oscillator 10. The speed of the motor is chosen so that the scan of the bandwidth may be accomplished in any desired time, for example, overnight. As the frequency of the oscillator 10 is varied, the rate of decay of the pulses generated by the oscillator 10 also changes. This change in the rate of decay also results in a change in the noise level of the system.

The signal that is applied to the sample 11 is modulated by means of the Helmholtz coils 16, the reference oscillator 17, the power amplifier 18, and the rectifier 19, as previously described. Thus, any signal emitted from the sample 11 will be detected as a function of the modulating frequency.

The signal coming from the oscillator 10 is a composite of a constant, random noise signal and a modulated signal that is comprised of the quench pulses plus any nuclear signal. The filter 15 removes the quench pulses. This results in a signal that is comprised of noise plus the nuclear signal. Since the nuclear signal will be in phase with the modulating frequency, and since the detector 20 detects any signal in phase with and of the same frequency as the reference frequency of the oscillator 17, the nuclear signal will be detected and displayed on the "Y" coordinate of the XY recorder 21.

The filter 23 of the feedback loop previously described rejects from the noise spectrum any signal that is of the same frequency as the modulating frequency generated by the reference oscillator 17. Thus, the output of the filter 23 represents the noise signal inasmuch as any nuclear signal is filtered out. It is important that the nuclear signal be subtracted out of the feedback loop because if not, it may be mistaken for an increase in the noise signal. The system would then automatically compensate for the mistaken increase in the noise signal which would result in an obduration of the nuclear signal.

As previously described, the pure noise signal is converted to a D-C signal and compared to the reference signal generated by the Zener diode source 26. Any difference in the D-C signals generates an error signal which is detected by the servo amplifier 29. By means of the servo motor 30 and speed reducer 31, the grid bias potentiometer 32 of the oscillator 10 is adjusted. This adjustment varies the quench frequency of the oscillator 10 and subsequently keeps the noise signal constant.

It is obvious to those skilled in the art that numerous changes and modifications may be made to the embodiment of the invention as it has been disclosed above. For example, means for directly reading resonance frequencies may be added to the system. Although the system has been disclosed in terms of a tube type oscillator, the same theory applies by analogy to solid state amplifiers. For expediency, certain precautions were taken to prevent microphonics. Other known forms for preventing microphonics can be used. The above modifications and others too numerous to mention can be made without departing from the spirit and scope of the invention as set forth in the above specification and the appended claims.

What is claimed is:

1. Apparatus for detecting low level nuclear resonance in a material wherein the noise level of said apparatus is automatically stabilized over a wideband of frequencies comprising means for impressing a magnetic field about said material; means for generating pulse envelopes of radio frequency energy, the rate at which said pulses are generated being at least partially related to said noise level; means for applying said pulse envelopes to said material; means for detecting resonance signals emitted from said material; means for making the pulse generation rate responsive to said emitted resonance signals; means for detecting the noise level of said pulse generating means; means for establishing a predetermined reference voltage; means for comparing the voltage of said noise level with said reference voltage; means for sensing the difference between said noise voltage and said reference voltage; and means for adjusting said noise level in accordance with said difference voltage so as to reduce said difference voltage substantially to zero so as to maintain said noise level constant.

2. The apparatus of claim 1 wherein said generating means comprises a superregenative oscillator.

3. The apparatus of claim 2 wherein said superregenerative oscillator is a self-quenched oscillator.

4. The apparatus of claim 3 wherein said magnetic field means includes means for modulating said magnetic field.

5. The apparatus of claim 2 wherein said adjusting means includes a potentiometer which provides a correction voltage to said oscillator; an independent voltage source associated with said potentiometer; together with means to vary said potentiometer responsive to said difference voltage to select an amount of said independent voltage as said correction voltage.

6. The apparatus of claim 5 wherein said varying means includes a motor; means for coupling said motor to said potentiometer; and means for having said motor operative in response to said difference voltage.

References Cited

UNITED STATES PATENTS 3,153,756 10/1964 Williams ----------- 324—0.5

OTHER REFERENCES

The Review of Scientific Instruments, vol. 29, No. 7, July 1958, pp. 630–632.

The Review of Scientific Instruments, vol. 29, No. 11, November 1958, p. 1047.

RUDOLPH V. ROLINEC, *Primary Examiner.*

MICHAEL J. LYNCH, *Assistant Examiner.*